US012614827B2

(12) United States Patent
  Kim et al.

(10) Patent No.: US 12,614,827 B2
(45) Date of Patent: Apr. 28, 2026

(54) WIRELESS COMMUNICATION DEVICE COMPRISING A PHASE SHIFTING ELEMENT HAVING PLURAL PORT UNITS CONNECTED BY PLURAL CONDUCTIVE WIRES

(71) Applicant: LG INNOTEK CO., LTD., Seoul (KR)

(72) Inventors: Yu Seon Kim, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 74 days.

(21) Appl. No.: 18/572,280

(22) PCT Filed: Jun. 20, 2022

(86) PCT No.: PCT/KR2022/008686
  § 371 (c)(1),
  (2) Date: Dec. 20, 2023

(87) PCT Pub. No.: WO2022/270839
  PCT Pub. Date: Dec. 29, 2022

(65) Prior Publication Data
  US 2024/0291147 A1      Aug. 29, 2024

(30) Foreign Application Priority Data

Jun. 21, 2021    (KR) ........................ 10-2021-0079968

(51) Int. Cl.
  *H01P 1/18*        (2006.01)
  *H01P 9/00*        (2006.01)
  (Continued)
(52) U.S. Cl.
  CPC .............. *H01P 1/184* (2013.01); *H01P 9/006* (2013.01); *H01Q 3/36* (2013.01); *H04B 1/40* (2013.01)

(58) Field of Classification Search
  CPC ....................................................... H01P 1/184
  (Continued)

(56) References Cited

U.S. PATENT DOCUMENTS 5,815,050 A        9/1998  Brooks et al.
2005/0093737 A1*   5/2005  Schoebel ................ H01P 1/184
                                                342/72
(Continued)

FOREIGN PATENT DOCUMENTS

CN      106972224      7/2017
JP      S61-137403     6/1986
(Continued)

OTHER PUBLICATIONS

International Search Report dated Oct. 13, 2022 issued in Application No. PCT/KR2022/008686.
(Continued)

*Primary Examiner* — Benny T Lee
(74) *Attorney, Agent, or Firm* — KED & ASSOCIATES, LLP

(57)        ABSTRACT

The present invention relates to a phase shifter having low loss in broadband, and a wireless communication device comprising same. The wireless communication device according to one embodiment comprises: a wireless communication module; a first antenna; a first transmission line for allowing the transmission of a signal between the wireless communication module and the first antenna; and a phase shifting element arranged in series on the first transmission line, wherein the phase shifting element is stacked in the vertical direction and can include a plurality of resonant unit elements electrically connected in parallel to one another.

19 Claims, 8 Drawing Sheets

(51) Int. Cl.
    *H01Q 3/36*      (2006.01)
    *H04B 1/40*      (2015.01)

(58) Field of Classification Search
    USPC .......................................................... 333/161
    See application file for complete search history.

(56) References Cited

U.S. PATENT DOCUMENTS

| | | |
|---|---|---|
| 2019/0173175 A1 | 6/2019 | Mikawa et al. |
| 2021/0036404 A1 | 2/2021 | Lee et al. |

FOREIGN PATENT DOCUMENTS

| | | |
|---|---|---|
| JP | H04-78804 | 7/1992 |
| JP | H04-110004 | 9/1992 |
| JP | H05-183312 | 7/1993 |
| JP | H05-304433 | 11/1993 |
| JP | H08-330801 | 12/1996 |
| JP | H11-145710 | 5/1999 |
| JP | 2002-290105 | 10/2002 |
| KR | 10-2012-0132802 | 12/2012 |
| KR | 10-2021-0015262 | 2/2021 |

OTHER PUBLICATIONS

European Search Report dated May 26, 2025 issued in Application No. 22828686.0.
Japanese Office Action dated Jan. 20, 2026 issued in Application No. 2023-577959.

\* cited by examiner

COMPARATIVE EXAMPLE

EMBODIMENT

RESONANCE BLOCK

ELECTRICAL
LENGTH β
(Phase)

+180

FREQUENCY

-180

COMPARATIVE EXAMPLE

ELECTRICAL
LENGTH β
(Phase)

+180

VARIATION

FREQUENCY

-180

EMBODIMENT

WIRELESS COMMUNICATION DEVICE COMPRISING A PHASE SHIFTING ELEMENT HAVING PLURAL PORT UNITS CONNECTED BY PLURAL CONDUCTIVE WIRES

CROSS-REFERENCE TO RELATED PATENT APPLICATIONS

This application is a U.S. National Stage Application under 35 U.S.C. § 371 of PCT Application No. PCT/KR2022/008686, filed Jun. 20, 2022, which claims priority to Korean Patent Application No. 10-2021-0079968, filed Jun. 21, 2021, whose entire disclosures are hereby incorporated by reference.

TECHNICAL FIELD

The present disclosure relates to a phase shifter having low loss in a broadband and a wireless communication device including the same.

BACKGROUND ART

According to the recent trend toward increasingly large and slim display devices, display devices are mainly used in a wall-mounted state, and are generally equipped with a wireless communication module, such as a Wi-Fi or Bluetooth (BT) module, for convenient wireless connection to external devices that provide source content, such as mobile devices.

However, such a wireless communication module is generally mounted on a rear side of a display panel, and thus when a large display device is used in a wall-mounted state, it is difficult for radio waves to travel from a region between the wall and the display panel to a region ahead of the display panel. Therefore, even when an external device, with which wireless communication is established, is located relatively close to the wireless communication module of the display device, it is difficult to achieve excellent communication quality.

As a countermeasure thereto, a phase shifter is mounted on a transmission path between a wireless communication module and an antenna in order to change a travel direction (i.e., radiation pattern) of a wireless signal. Of course, in addition to the purpose of changing the travel direction, the phase shifter may generate a phase difference of 180 degrees between one antenna of a dipole antenna and the other antenna thereof, thereby realizing antenna gain with maximum efficiency.

However, it is difficult to realize antenna gain with maximum efficiency through phase control under the current situation in which an antenna having an end length of ½ or ¼ of the minimum resonant wavelength is applied to most devices in order to miniaturize the devices.

SUMMARY OF THE INVENTION

Technical Problem

The present disclosure has been made in order to solve the above problems with the related art, and provides a phase shifter having superior phase shifting performance in a broadband and a wireless communication device including the same.

The objects of the present disclosure are not limited to the above-mentioned objects, and other objects not mentioned herein will be clearly understood by those skilled in the art from the following description.

Technical Solution

A wireless communication device according to an embodiment may include a wireless communication module, a first antenna, a first transmission line configured to transmit a signal between the wireless communication module and the first antenna, and a phase shifting element disposed on the first transmission line, wherein the phase shifting element may include a first port unit disposed on one side thereof in a first direction, the first port unit including a plurality of first ports stacked while being spaced apart from each other in a vertical direction, a second port unit disposed on the other side thereof in the first direction, the second port unit including a plurality of second ports stacked while being spaced apart from each other in the vertical direction, and a plurality of conductive wires extending in the first direction, each of the plurality of conductive wires being configured to conductively interconnect a corresponding pair of ports facing each other in the first direction among the plurality of first ports and the plurality of second ports.

In an example, the plurality of first ports may at least partially overlap each other in the vertical direction, and the plurality of second ports may at least partially overlap each other in the vertical direction.

In an example, each of the plurality of first ports and the plurality of second ports may extend in a second direction intersecting the first direction.

In an example, at least some of the plurality of conductive wires may overlap each other in the vertical direction.

In an example, the plurality of conductive wires may not overlap each other in the vertical direction.

In an example, at least some of the plurality of conductive wires may include multiple conductive wires disposed so as to be parallel to each other and to be spaced apart from each other in a second direction intersecting the first direction.

In an example, the plurality of first ports may be conductively connected to each other through a first through-hole extending in the vertical direction, and the plurality of second ports may be conductively connected to each other through a second through-hole extending in the vertical direction.

In an example, each of the first through-hole and the second through-hole may include a half-through hole having a semicircular planar shape.

In an example, the width of each of the plurality of first ports and the plurality of second ports in the second direction may be greater than the width thereof in the first direction, and the length of each of the plurality of conductive wires in the first direction may be greater than the width thereof in the second direction.

In an example, the phase shifting element may further include a barrier unit including a plurality of third through-holes spaced apart from each other in the first direction, and each of the plurality of third through-holes may be spaced apart from the plurality of conductive wires in the second direction.

In an example, the wireless communication device may further include a second antenna and a second transmission line configured to transmit a signal between the wireless communication module and the second antenna. The plurality of conductive wires may face the second transmission line in the second direction with the barrier unit interposed therebetween.

Advantageous Effects

A phase shifter and a wireless communication device including the same according to the present disclosure have the following effects.

First, it may be possible to realize miniaturization in a chip-type shape having a pattern stacking structure.

Second, it may be possible to control phase variation and impedance matching through diversification of the number of stacked layers and passages in the layers.

Third, it may be possible to implement the function of a low pass filter through a single element.

The effects achievable through the present disclosure are not limited to the above-mentioned effects, and other effects not mentioned herein will be clearly understood by those skilled in the art from the following description.

BRIEF DESCRIPTION OF THE DRAWINGS

The accompanying drawings are included to provide a further understanding of the disclosure and illustrate embodiments of the disclosure together with the detailed description. However, the technical features of the disclosure are not limited to specific drawings, and the features shown in the drawings may be combined to construct a new embodiment.

FIG. 1 illustrates an example of the configuration of a wireless communication device according to an embodiment.

FIG. 2 is a transparent perspective view showing an example of the structure of a phase shifter according to an embodiment.

FIG. 3 is a transparent perspective view showing an example of the structure of a phase shifter according to another embodiment.

FIG. 6 illustrates an embodiment of a wireless communication device to which the phase shifter shown in FIG. 5 is applied.

BEST MODE FOR CARRYING OUT THE INVENTION

Figure 4:
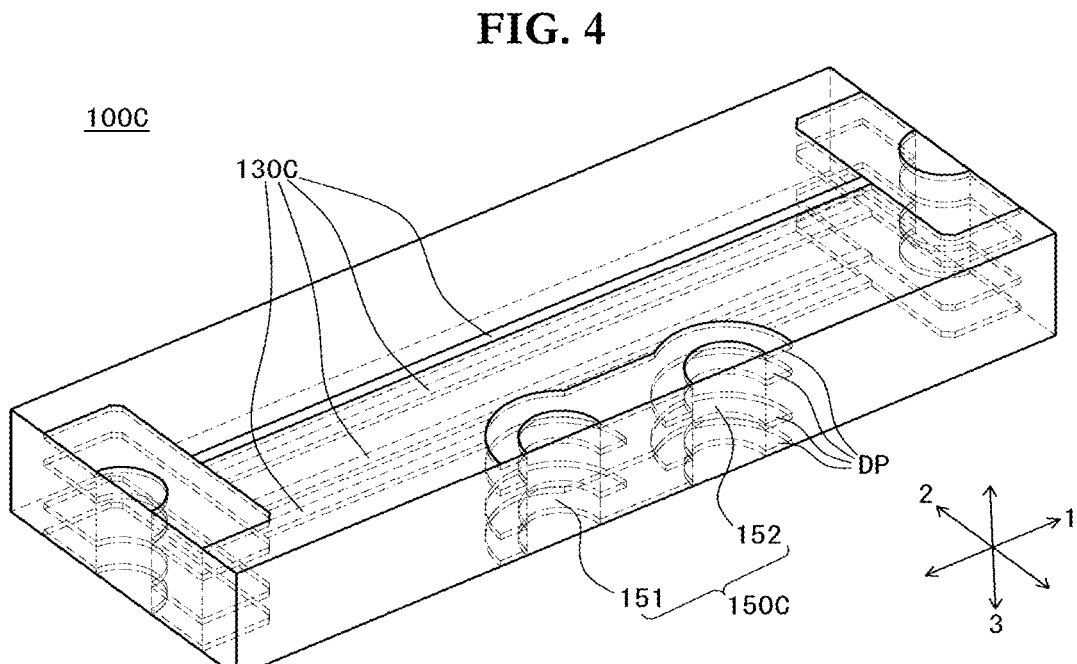
FIG. 4 is a transparent perspective view showing an example of the structure of a phase shifter according to still another embodiment.

Hereinafter, devices and various methods to which embodiments of the present disclosure are applied will be described in detail with reference to the accompanying drawings. The suffixes "module" and "unit" used herein to describe configuration components are assigned or used in consideration only of convenience in creating this specification, and the two suffixes themselves do not have any distinguished meanings or roles from each other.

In the following description of the embodiments, it will be understood that, when each element is referred to as being formed "on" or "under" and "ahead of" or "behind" another element, it can be directly "on" or "under" and "ahead of" or "behind" the other element, or can be indirectly formed with one or more intervening elements therebetween.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

Additionally, the term "comprises", "includes", or "has" described herein should be interpreted not to exclude other elements but to further include such other elements since the corresponding elements may be inherent unless mentioned otherwise.

Unless otherwise defined, all terms used herein, which include technical or scientific terms, have the same meanings as those generally appreciated by those skilled in the art. Terms such as those defined in common dictionaries should be interpreted as having the same meanings as terms in the context of the pertinent technology, and should not be interpreted as having ideal or excessively formal meanings unless clearly defined in the specification. In each of FIGS. 2 to 6, the references 1, 2, and 3 associated with the coordinate axes represent a first-axis direction, a second-axis, and a third-axis direction, respectively.

Prior to describing a phase shifter according to embodiments of the present disclosure in detail with reference to the accompanying drawings, the configuration of a wireless communication device to which the phase shifter according to embodiments is applicable will be first described below with reference to FIG. 1.

Figure 1:
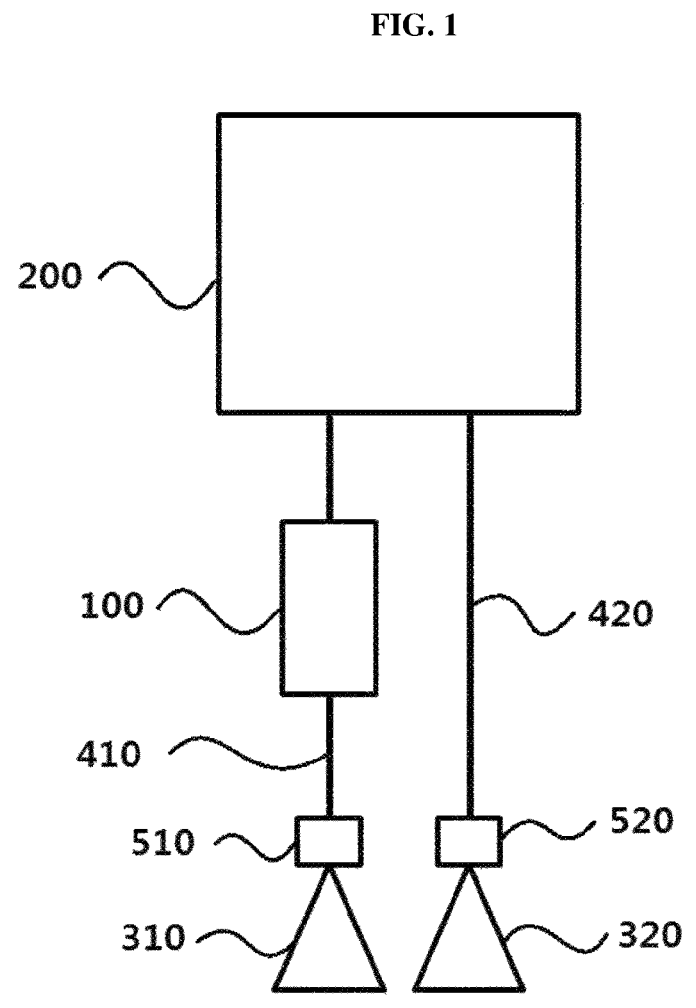

FIG. 1 illustrates an example of the configuration of a wireless communication device according to an embodiment.

Referring to FIG. 1, a wireless communication device according to an embodiment may include a wireless communication module 200, a first antenna 310, a second antenna 320, a first transmission line 410 disposed between the first antenna 310 and the wireless communication module 200, a second transmission line 420 disposed between the second antenna 320 and the wireless communication module 200, and a phase shifter 100 connected in series to the first transmission line 410.

The wireless communication module 200 may support one or more wireless communication protocols. Here, the wireless communication protocol may include at least one of 4G/5G, Bluetooth (BT), or Wi-Fi, but this is merely illustrative, and the disclosure is not necessarily limited thereto.

The first antenna 310 and the second antenna 320 may constitute a dipole antenna. However, the disclosure is not necessarily limited thereto. For example, the first antenna 310 and the second antenna 320 may constitute a multiple input multiple output (MIMO) antenna.

Meanwhile, the first antenna 310 and the second antenna 320 may be connected to the first transmission line 410 and the second transmission line 420 via antenna terminals 510 and 520, respectively. However, the antenna terminals 510 and 520 may be omitted depending on an embodiment (e.g., a planar antenna having a pattern integrally formed with a transmission line, etc.).

The phase shifter 100 may be referred to as a phase shifting element. When signals output simultaneously from the wireless communication module 200 to the first transmission line 410 and the second transmission line 420 reach the first antenna 310 and the second antenna 320, the phase shifter may control a phase difference between the two signals to a target value. For example, when the first antenna 310 and the second antenna 320 constitute a dipole antenna, the target value may be set to 180 degrees. Of course, this target value is illustrative, and may be set to a value different from 180 degrees for the purpose of beam steering. On the other hand, in the case of receiving signals, when the signals received simultaneously by the first antenna 310 and the second antenna 320 reach the wireless communication module 200 via the first transmission line 410 and the second transmission line 420, a phase difference between the signals input from the respective transmission lines may also be set to a target value by the phase shifter 100.

Hereinafter, the structure of the phase shifter 100 according to embodiments will be described with reference to FIGS. 2 to 5.

Figure 2:
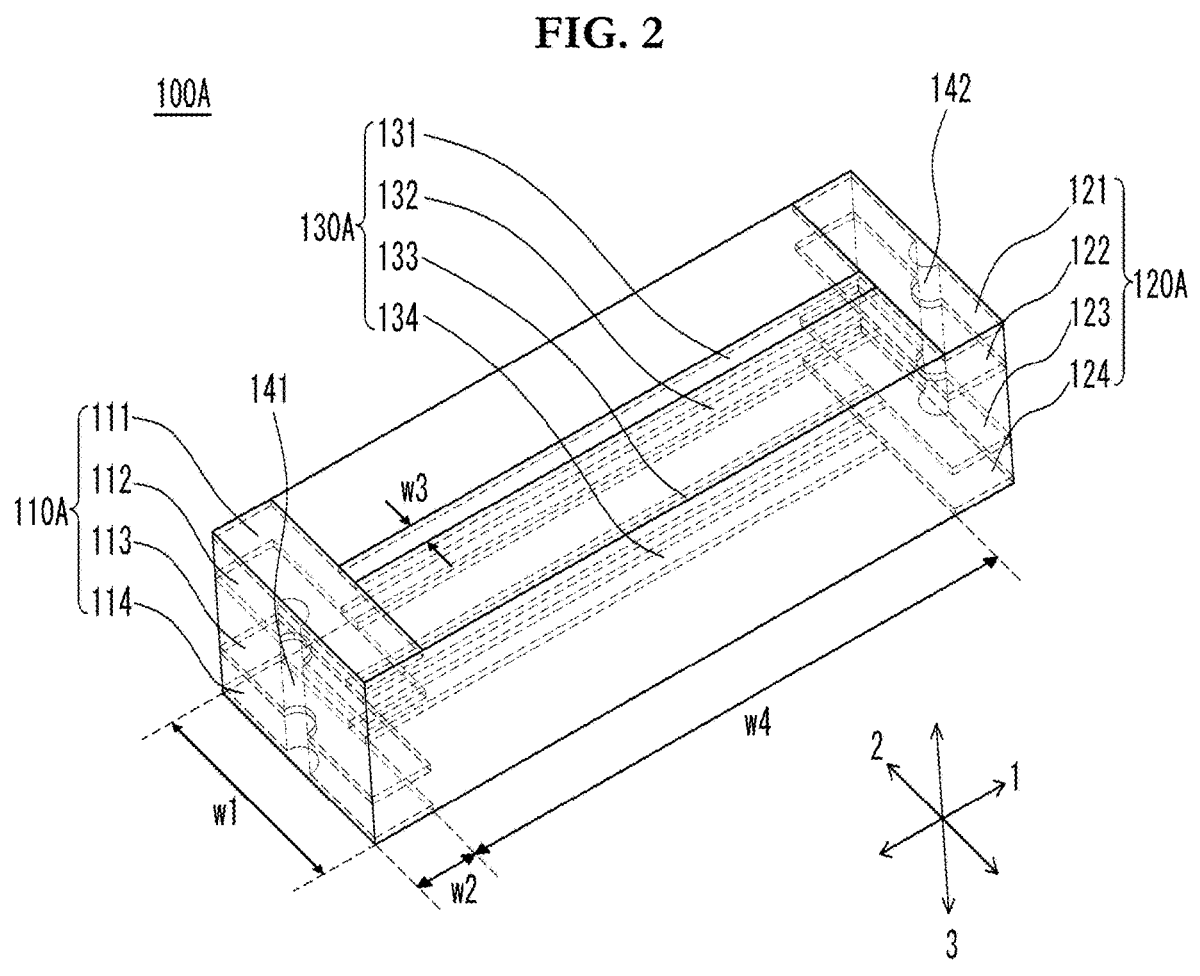

FIG. 2 is a transparent perspective view showing an example of the structure of a phase shifter according to an embodiment.

Referring to FIG. 2, a phase shifter 100A according to an embodiment may include a first port unit 110A, a second port unit 120A, a conductive wire unit 130A, and a plurality of through-holes 141 and 142.

The first port unit 110A may include a plurality of first ports 111, 112, 113, and 114 disposed on one side in a first-axis direction and stacked while being spaced apart from each other in a vertical direction (i.e., third-axis direction).

The second port unit 120A may include a plurality of second ports 121, 122, 123, and 124 disposed on a side opposite the first port unit 110A in the first-axis direction and stacked while being spaced apart from each other in the vertical direction.

Each of a plurality of conductive wires 131, 132, 133, and 134 constituting the conductive wire unit 130A may extend in the first-axis direction to conductively interconnect a corresponding pair of ports facing each other in the first-axis direction (i.e., ports located at the same height in the third-axis direction) among the plurality of first ports 111, 112, 113, and 114 and the plurality of second ports 121, 122, 123, and 124. For example, the first port 111 and the second port 121 disposed on the top layer in the third-axis direction may be conductively connected to each other via the conductive wire 131 disposed on the top layer in the third-axis direction.

Each of the plurality of first ports 111, 112, 113, and 114, the plurality of second ports 121, 122, 123, and 124, and the plurality of conductive wires 131, 132, 133, and 134 may include a conductive material such as copper. In addition, the plurality of first ports 111, 112, 113, and 114 may be conductively connected to each other via a first through-hole 141 that extends in the third-axis direction and is conductive, and the plurality of second ports 121, 122, 123, and 124 may be conductively connected to each other via a second through-hole 142 that extends in the third-axis direction and is conductive. Each of the first through-hole 141 and the second through-hole 142 may be formed in the shape of a half-through hole having a semicircular planar shape. However, the disclosure is not necessarily limited thereto.

Meanwhile, each of the first port 114 and the second port 124 disposed on the bottom layer may be conductively connected to the first transmission line 410 (FIG. 1).

The plurality of first ports 111, 112, 113, and 114 may at least partially overlap each other in the third-axis direction, and the plurality of second ports 121, 122, 123, and 124 may at least partially overlap each other in the third-axis direction. In addition, each of the plurality of first ports 111, 112, 113, and 114 and the plurality of second ports 121, 122, 123, and 124 may be formed in the shape of a plate extending in a second-axis direction, and the length w1 thereof in the second-axis direction may be longer than the length w2 thereof in the first-axis direction. In addition, the line width w3 of each of the plurality of conductive wires 131, 132, 133, and 134 may be less than the length w4 thereof in the first-axis direction. In addition, the line width w3 may be less than the length w1 of each of the plurality of first ports 111, 112, 113, and 114 and the plurality of second ports 121, 122, 123, and 124 in the second-axis direction.

For example, the plurality of conductive wires 131, 132, 133, and 134 may at least partially overlap each other in the third-axis direction. However, according to another embodiment, at least some of the plurality of conductive wires 131, 132, 133, and 134 may not overlap each other in the third-axis direction.

In the phase shifter 100A configured as described above, among the ports constituting the first port unit 110A and the second port unit 120A and the conductive wires constituting the conductive wire unit 130A, components located at the same height in the third-axis direction form a resonance unit, and form electromagnetic coupling with components located at different heights therefrom in the third-axis direction. Such electromagnetic coupling provides the effect of controlling an electrical length, and control of the electrical length means the capability to control a phase constant β on the transmission line. Therefore, this means that the phase shifter 100A according to the embodiment changes the phase of a signal passing through the first transmission line 410.

Consequently, it may be possible to obtain various target phase difference values between the antennas by changing the line width w3, the line length w4, the number of stacked layers, and the distance between the conductive wires of the conductive wire unit 130A (e.g., the spacing distance between the conductive wires in the third-axis direction, overlap or non-overlap between the conductive wires in the third-axis direction, etc.).

According to the embodiment, among the ports constituting the first port unit 110A and the second port unit 120A and the conductive wires constituting the conductive wire unit 130A, the components located at the same height in the third-axis direction, i.e., the resonance unit elements, may be implemented in the form of a single conductive printed pattern formed on a substrate (not shown). For example, as shown in FIG. 2, the phase shifter 100A according to the embodiment may have a total of four resonance unit elements. In this case, the phase shifter 100A may be formed by stacking four substrates in the third-axis direction. That is, the uppermost resonance unit elements 111, 121, and 131 may be formed on the upper surface of a first substrate (not shown) disposed on the top layer, the second resonance unit elements 112, 122, and 132 may be formed on the upper surface of the second substrate (not shown) disposed below the first substrate, the third resonance unit elements 113, 123, and 133 may be formed on the lower surface of a third substrate (not shown) disposed below the second substrate, and the lowermost resonance unit elements 114, 124, and 134 may be formed on the lower surface of a fourth substrate (not shown) disposed below the third substrate.

Of course, the line width w3, the line length w4, the number of stacked layers in the third-axis direction, and the distance between the conductive wires shown in FIG. 2 are merely illustrative, and it will be apparent to those skilled in the art that various modifications are possible.

Figure 3:
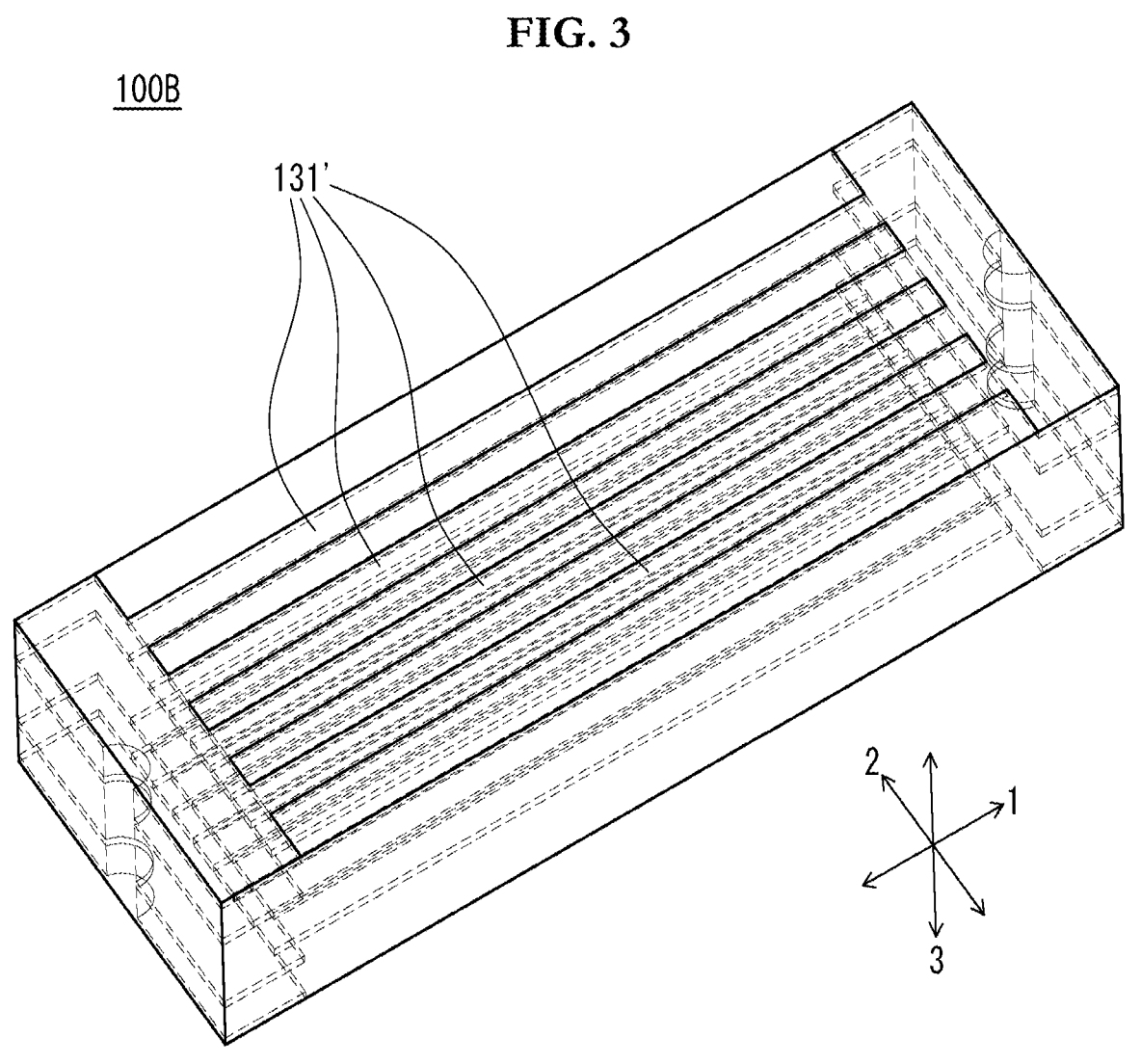

FIG. 3 is a transparent perspective view showing an example of the structure of a phase shifter according to another embodiment.

A phase shifter 100B according to the other embodiment shown in FIG. 3 has the same configuration as the phase shifter 100A shown in FIG. 2 except for the configuration of a conductive wire 131'. Therefore, a difference from the phase shifter 100A shown in FIG. 2 will be mainly described.

Referring to FIG. 3, the phase shifter 100B according to the other embodiment is configured such that a conductive wire constituting each resonance unit element includes multiple conductive wires 131' spaced apart from each other in the second-axis direction.

FIG. 4 is a transparent perspective view showing an example of the structure of a phase shifter according to still another embodiment.

A phase shifter 100C according to the still other embodiment shown in FIG. 4 has a configuration similar to that of the phase shifter 100A shown in FIG. 2 except for addition of a barrier unit 150C. Therefore, a difference from the phase shifter 100A shown in FIG. 2 will be mainly described.

Referring to FIG. 4, a phase shifter 100C according to the still other embodiment includes a barrier unit 150C including a plurality of third through-holes 151 and 152 spaced apart from each other in the first-axis direction. Each of the third through-holes 151 and 152 constituting the barrier unit 150C may extend in the third-axis direction, and may be spaced apart from the conductive wire unit 130C in the second-axis direction.

In addition, each of the third through-holes 151 and 152 may be formed in the shape of a half-through hole having a semicircular planar shape. However, the disclosure is not necessarily limited thereto.

According to the embodiment, when the phase shifter 100C is formed through the above-described substrate stacking method, conductive dummy pads DP may be formed on the surfaces of the substrates (not shown) on which the conductive printed patterns corresponding to the resonance unit elements are formed, and the third through-holes 151 and 152 may be formed through the dummy pads DP in the third-axis direction. Here, the uppermost dummy pads DP of the third through-holes 151 and 152 may be integrally formed with each other, and the lowermost dummy pads DP of the third through-holes 151 and 152 may be integrally formed with each other.

Meanwhile, the barrier unit 150C may be conductively connected to a ground provided on a substrate (not shown) on which the phase shifter 100C is mounted.

Figure 5:
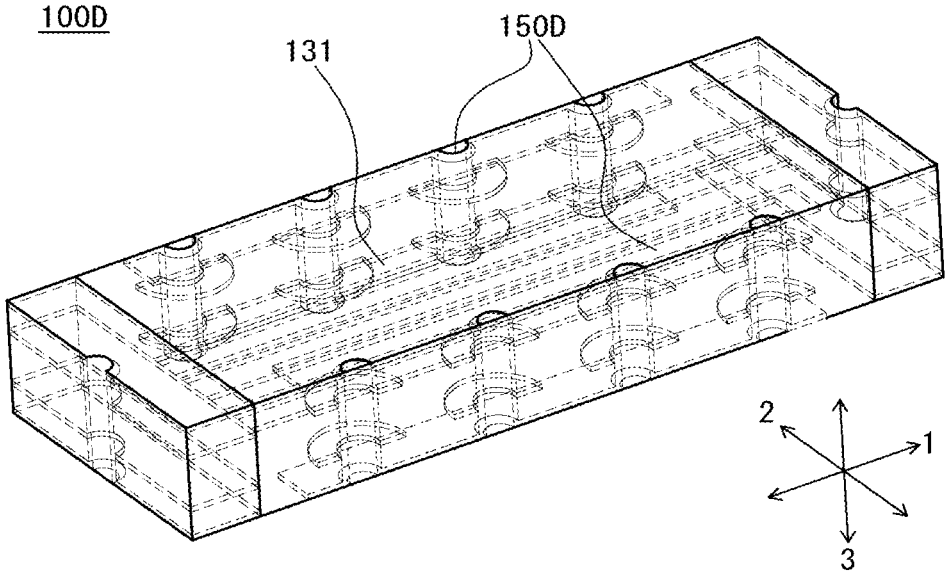
FIG. 5 is a transparent perspective view showing an example of the structure of a phase shifter according to still another embodiment.

FIG. 5 is a transparent perspective view showing an example of the structure of a phase shifter according to still another embodiment.

A phase shifter 100D according to the still other embodiment shown in FIG. 5 is different from the phase shifter 100C shown in FIG. 4 in that barrier units 150D are disposed on both sides thereof in the second-axis direction with respect to a conductive wire 131 and the number of through-holes constituting each of the barrier units 150D is increased.

Figure 6:
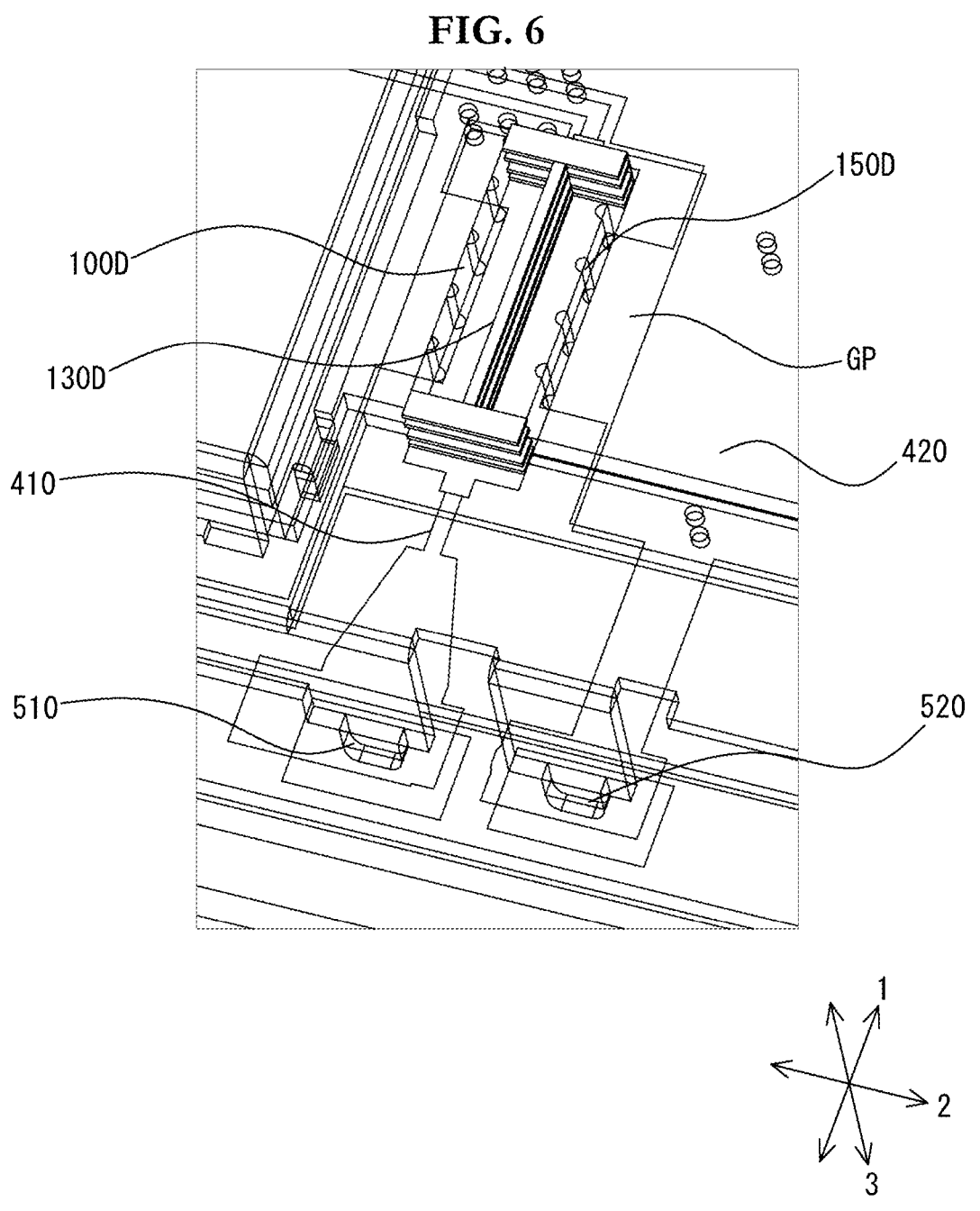

FIG. 6 illustrates an embodiment of a wireless communication device to which the phase shifter shown in FIG. 5 is applied.

FIG. 6 illustrates an exemplary structure in which the phase shifter 100D according to the still other embodiment is mounted on a substrate of a wireless communication device so as to be connected in series to the first transmission line 100D. Further, in FIG. 6, illustration of the first antenna 310 and the second antenna 320 is omitted, and the antenna terminals 510 and 520 corresponding thereto are illustrated.

Referring to FIG. 6, as described above, it can be seen that the barrier unit 150D of the phase shifter 100D is disposed on a ground pad GP of the substrate. The second transmission line 420 is disposed to one side of the phase shifter 100D in the second-axis direction. Therefore, the conductive wire unit 130D faces the second transmission line 420 in the second-axis direction with the barrier unit 150D interposed therebetween. Since the barrier unit 150D is connected to the ground and thus plays a shielding role, electromagnetic compatibility (EMC) performance and electromagnetic susceptibility (EMS) performance between the transmission lines are improved.

If the phase shifter 100D shown in FIG. 6 is replaced with the phase shifter 100C according to the still other embodiment shown in FIG. 4, it is preferable that the phase shifter 100C be disposed such that the barrier unit 150C is located between the conductive wire unit 130C and the second transmission line 420 in the second-axis direction.

Meanwhile, it is preferable that the phase shifter be mounted on the substrate of the wireless communication device such that radiation impedance of the antenna and transmission line impedance are matched with each other based on the antenna terminals 510 and 520.

Hereinafter, the effects of the phase shifters 100A, 100B, 100C, and 100D according to the embodiments will be described with reference to FIGS. 7 to 9.

Figure 7:
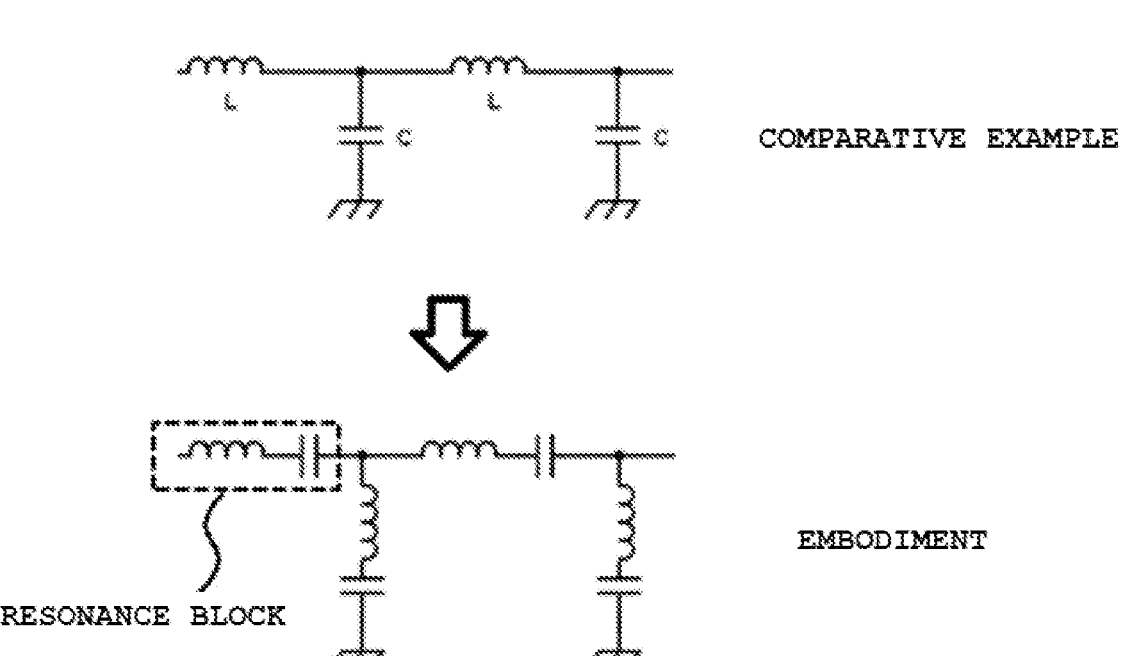
FIG. 7 is a diagram for explaining the coupling characteristics of the phase shifters according to the embodiments.

FIG. 7 is a diagram for explaining the coupling characteristics of the phase shifters according to the embodiments.

Referring to FIG. 7, a phase shifter according to a comparative example is generally implemented as a combination of inductors L and capacitors C so as to establish an equivalent circuit in which the inductors L are connected in series to each other and the capacitors C are connected in parallel to each other.

In contrast, each of the phase shifters 100A, 100B, 100C, and 100D according to the embodiments is configured such that an L-C resonance block having both inductance and capacitance is formed for each resonance unit element, whereby electromagnetic coupling is formed in each resonance block. In addition, since the resonance unit elements are connected in parallel to each other through the first through-hole 141 and the second through-hole 142, resistance is reduced, and a skin effect decreases compared to a single conductive wire.

Figure 8:
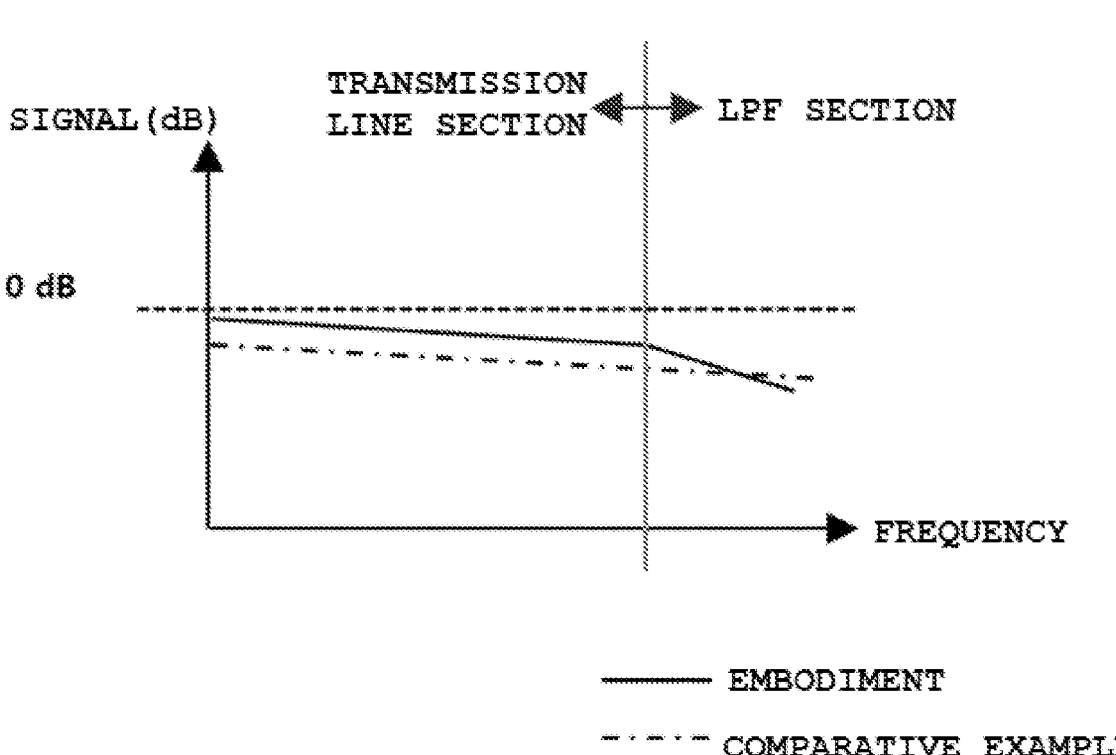
FIG. 8 is a diagram for explaining the characteristics of each frequency band of the phase shifters according to the embodiments.

FIG. 8 is a diagram for explaining the characteristics of each frequency band of the phase shifters according to the embodiments.

Referring to FIG. 8, in the case of a general transmission line (corresponding to COMPARATIVE EXAMPLE shown in FIG. 8), as the frequency increases, a signal in dB is attenuated at a constant slope. In contrast, when the phase shifters 100A, 100B, 100C, and 100D according to the embodiments (corresponding to EMBODIMENT shown in FIG. 8) are applied to the transmission line, excellent transmission efficiency is obtained at a frequency lower than a specific frequency compared to a general transmission line, and the effect of passing a signal through a low pass filter (LPF) is obtained at a frequency higher than the specific frequency. Therefore, it may be possible to reduce high-frequency noise while obtaining not only a phase control effect but also high transmission efficiency in a broadband by setting a specific frequency to be higher than a mainly used band of the wireless communication module 200. Here, the specific frequency may be controlled through changes in the line width w3, the line length w4, the number of stacked layers in the third-axis direction, and the distance between the conductive wires.

Figure 9:
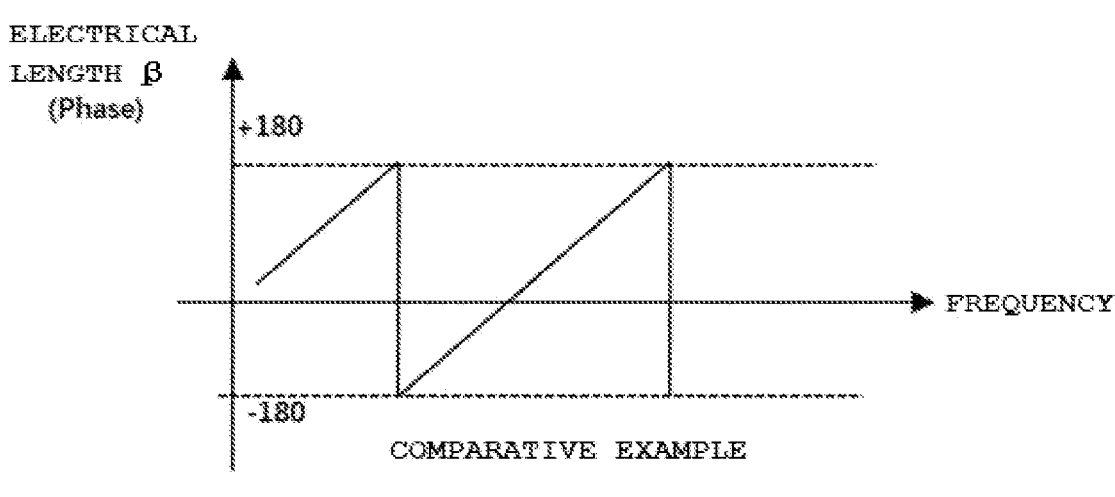
FIG. 9 is a diagram for explaining the phase control performance characteristics of the phase shifters according to the embodiments.
Figure 9:
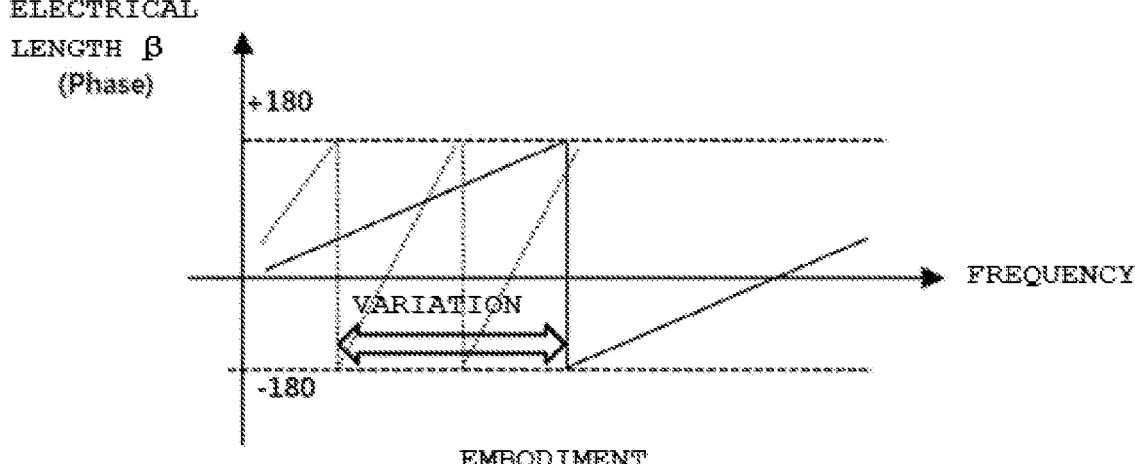

FIG. 9 is a diagram for explaining the phase control performance characteristics of the phase shifters according to the embodiments.

Referring to FIG. 9, in the case of a general phase controller (corresponding to COMPARATIVE EXAMPLE shown in FIG. 9) according to a comparative example, an electrical length (i.e., β) has a fixed value with respect to the frequency. In contrast, in the case of the phase controllers according to the embodiments (corresponding to EMBODI-MENT shown in FIG. 9), the electrical length (i.e., β) may be varied (i.e. VARIATION) depending on the line width w3, the line length w4, the number of stacked layers in the third-axis direction, and the distance between the conductive wires. Therefore, it may be possible to realize various target phase difference values regardless of the topology of the wireless communication device to which the phase control-lers according to the embodiments are to be mounted.

While the present disclosure has been particularly shown and described with reference to exemplary embodiments thereof, these embodiments are only proposed for illustra-tive purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclo-sure as defined by the appended claims.

BEST MODE FOR THE INVENTION

Various embodiments have been described in the best mode for carrying out the disclosure.

INDUSTRIAL APPLICABILITY

A phase shifter and a wireless communication device including the same according to embodiments may be used for display devices and the like.

The invention claimed is:

1. A wireless communication device, comprising:
a wireless communication module;
a first antenna;
a first transmission line configured to transmit a signal between the wireless communication module and the first antenna; and
a phase shifting element disposed on the first transmission line,
wherein the phase shifting element includes:
a first port unit disposed on one side thereof in a first direction, the first port unit including a plurality of first ports stacked while being spaced apart from each other in a vertical direction;
a second port unit disposed on an opposite side thereof in the first direction, the second port unit including a plurality of second ports stacked while being spaced apart from each other in the vertical direction; and
a plurality of conductive wires extending in the first direction, each of the plurality of conductive wires being configured to conductively interconnect a corre-sponding pair of ports facing each other in the first direction among the plurality of first ports and the plurality of second ports,
wherein the plurality of first ports are conductively con-nected to each other through a first through-hole extending in the vertical direction, and
wherein the plurality of second ports are conductively connected to each other through a second through-hole extending in the vertical direction.

2. The wireless communication device according to claim 1,
wherein the plurality of first ports overlap each other in the vertical direction, and
wherein the plurality of second ports overlap each other in the vertical direction.

3. The wireless communication device according to claim 1, wherein each of the plurality of first ports and the plurality of second ports extends in a second direction intersecting the first direction.

4. The wireless communication device according to claim 1, wherein the plurality of conductive wires do not overlap each other in the vertical direction.

5. The wireless communication device according to claim 4, wherein at least some of the plurality of conductive wires include multiple conductive wires disposed so as to be parallel to each other and to be spaced apart from each other in a second direction intersecting the first direction.

6. The wireless communication device according to claim 1, wherein a width of each of the plurality of conductive wires in a second direction intersecting the first direction is less than the width of each of the plurality of first ports and the plurality of second ports in the second direction.

7. The wireless communication device according to claim 1, wherein each of the first through-hole and the second through-hole includes a half-through hole having a semicir-cular planar shape.

8. The wireless communication device according to claim 1,
wherein a width of each of the plurality of first ports and the plurality of second ports in a second direction intersecting the first direction is greater than a width thereof in the first direction, and
wherein a length of each of the plurality of conductive wires in the first direction is greater than a width thereof in the second direction.

9. The wireless communication device according to claim 1,
wherein the phase shifting element further includes a barrier unit including a plurality of third through-holes spaced apart from each other in the first direction, and
wherein each of the plurality of third through-holes is spaced apart from the plurality of conductive wires in a second direction intersecting the first direction.

10. The wireless communication device according to claim 9, further comprising:
a second antenna; and
a second transmission line configured to transmit a signal between the wireless communication module and the second antenna,
wherein the plurality of conductive wires faces the second transmission line in the second direction with the barrier unit interposed therebetween.

11. The wireless communication device according to claim 10, further comprising:

a first antenna terminal connecting the first antenna to the first transmission line; and a second antenna terminal connecting the second antenna to the second transmission line.

12. The wireless communication device according to claim 10, wherein, each of the first antenna and the second antenna constitutes a dipole antenna, and a target value of the phase shifting element is set to 180 degrees.

13. The wireless communication device according to claim 10, wherein, when signals received simultaneously by the first antenna and the second antenna reach the wireless communication module via the first transmission line and the second transmission line, a phase difference between signals input from the respective transmission lines is set to a target value of the phase shifting element.

14. The wireless communication device according to claim 9, wherein each of the plurality of third through-holes includes a half-through hole having a semicircular planar shape.

15. The wireless communication device according to claim 9, wherein the barrier unit is disposed on a ground pad of a substrate to be connected to a ground.

16. The wireless communication device according to claim 1, wherein at least some of the plurality of conductive wires overlap each other in the vertical direction.

17. The wireless communication device according to claim 1, wherein each of a lowest port among the plurality of the first ports and a lowest port among the plurality of the second ports is conductively connected to the first transmission line.

18. The wireless communication device according to claim 1, wherein components located at the same height in the vertical direction among the plurality of first ports, plurality of second ports, and the plurality of conductive wires form a resonance unit element.

19. The wireless communication device according to claim 18, wherein the resonance unit element has a form of a single conductive printed pattern.

* * * * *